United States Patent [19]

Sekine et al.

[11] 4,446,391

[45] May 1, 1984

[54] ROTATING ELECTRIC MACHINERY

[75] Inventors: Yasuhiro Sekine; Masayuki Kuwayama; Hiroshi Harada, all of Amagasaki, Japan

[73] Assignee: Mitsubishi Denki Kabushiki Kaisha, Tokyo, Japan

[21] Appl. No.: 314,029

[22] Filed: Oct. 22, 1981

[30] Foreign Application Priority Data

Oct. 24, 1980 [JP] Japan .............................. 55-149584

[51] Int. Cl.³ .............................................. H02K 9/06
[52] U.S. Cl. ...................................... 310/62; 310/63; 310/105; 310/108
[58] Field of Search ....................... 310/61, 62, 63, 58, 310/59, 51, 90, 60, 108, 92, 109, 96, 77, 78, 105, 114, 103, 104, 106, 156

[56] References Cited

U.S. PATENT DOCUMENTS

| | | | |
|---|---|---|---|
| 2,937,803 | 5/1960 | Cunningham | 310/103 |
| 3,209,184 | 9/1965 | Woodward | 310/103 |
| 3,229,132 | 1/1966 | Cohen | 310/105 |
| 3,456,141 | 7/1969 | Burgess | 310/58 |
| 3,566,168 | 2/1971 | Matsubara | 310/62 |

FOREIGN PATENT DOCUMENTS

| | | | |
|---|---|---|---|
| 671285 | 3/1937 | Fed. Rep. of Germany | 310/63 |
| 1188191 | 3/1965 | Fed. Rep. of Germany | 310/93 |
| 1563049 | 4/1970 | Fed. Rep. of Germany | 310/105 |
| 1613060 | 1/1971 | Fed. Rep. of Germany | 310/62 |
| 2653459 | 1/1978 | Fed. Rep. of Germany | 310/63 |
| 2821973 | 11/1978 | Fed. Rep. of Germany | 310/105 |
| 2355205 | 1/1978 | France | 310/40 R |
| 390375 | 8/1965 | Switzerland | 310/62 |
| 1268444 | 3/1972 | United Kingdom | 310/62 |
| 2054279 | 2/1981 | United Kingdom | 310/63 |
| 680113 | 8/1979 | U.S.S.R. | 310/62 |

Primary Examiner—R. Skudy
Attorney, Agent, or Firm—Oblon, Fisher, Spivak, McClelland & Maier

[57] ABSTRACT

A rotating electric machinery comprises a stator; a rotor which is fixed to a rotor shaft and is driven by said motor; a fan which is rotatably connected through a bearing to said rotor to feed air in a predetermined direction; and at least one pair of magnets having a predetermined magnetic force which are fixed on either said rotor or said fan and a magnetic substance having a predetermined coercive force which is fixed on said fan or on said rotor to face said magnet with a desired gap.

3 Claims, 8 Drawing Figures

F I G. 2
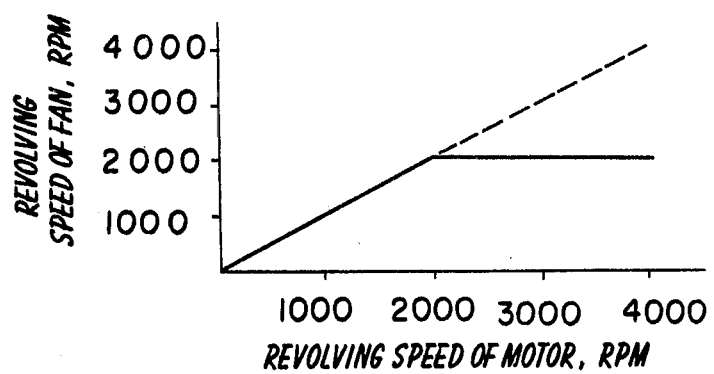
F I G. 3
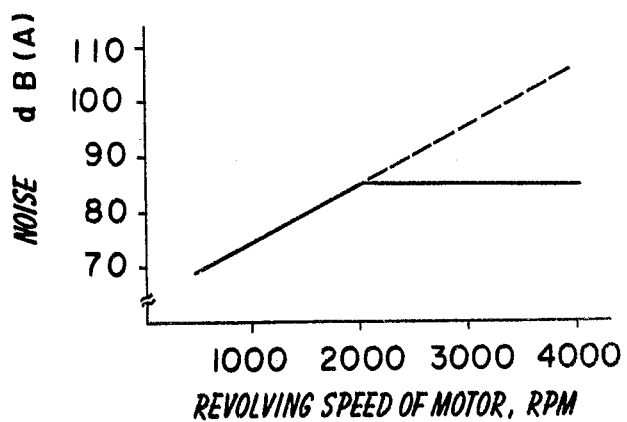

ROTATING ELECTRIC MACHINERY

BACKGROUND OF THE INVENTION

1. Field of the Invention

The present invention relates to a rotating electric machinery which reduces noise.

2. Description of the Prior Art

Heretofore, rotating electric machinery used for an electric car such as a traction motor has a structure shown in FIG. 1, wherein the reference numeral (1) designates a yoke; (2) designates a suction hole formed on the yoke (1); (3) designates an exhaust hole formed on the yoke (1); (4) and (5) respectively designate end brackets formed at each end of the yoke (1); (6) designates a bearing formed on each end bracket (4), (5); (7) designates a shaft supported by the bearing (6); (8) designates a rotor consisting of an iron core, a coil and a commutator connected to a spider (9); (10) designates an air-passage formed in the rotor (8) and the rotor spider (9); (11) designates a fan fixed on the shaft (7); (12) designates a brush device equipped with the end bracket (5) to contact with the commutator; and (13) designates a stator consisting of an iron core formed on the yoke (1) and a coil.

In the motor having the aforementioned structure, the fan (11) is driven depending upon the rotation of the rotor (8) whereby the air sucked from the air suction hole (2) is passed through the space between the rotor (8) and the stator (13) and the air passage (10) as shown by the broken arrow line to cool the heated rotor (8) and the stator (13). The air heated by the cooling said rotor and stator, is discharged through the exhaust hole (3) by the rotating fan (11).

The traction motor for an electric car is usually driven in a range of 0 to 4000 r.p.m. In the conventional traction motor, the fan (11) is fixed on the shaft (7). Therefore, the fan (11) rotates at the same revolving speed as that of the traction motor as shown by the broken line in FIG. 2. The noise caused in the revolving of the traction motor increases depending upon an increase of the revolving speed as shown by the broken line in FIG. 3. The main factor of the noise is considered as an air blow sound caused by the fan (11). In the conventional traction motor, the following relation is given;

$$\text{Noise of motor} \propto \text{revolving speed of fan} = \text{revolving speed of motor}$$

The conventional traction motor has the disadvantage that the noise increases depending upon the increase of the revolving speed.

SUMMARY OF THE INVENTION

It is an object of the present invention to overcome the aforementioned disadvantage and to provide a rotating electric machinery which has less noise at high revolving speed.

The foregoing and other objects of the present invention have been attained by providing a rotating electric machinery in which a fan is connected through a bearing to a shaft of a rotor; and at least one pair of magnets having a predetermined magnetic force and a magnetic substance having a predetermined coercive force given by magnetization resulted by the magnet.

BRIEF DESCRIPTION OF THE DRAWINGS

FIG. 2 is a graph showing the relation of the revolving speed of the traction motor and a fan;

FIG. 3 is a graph showing the relation of the revolving speed of the traction motor and the noise of the motor;

DETAILED DESCRIPTION OF THE PREFERRED EMBODIMENTS

Figure 1:
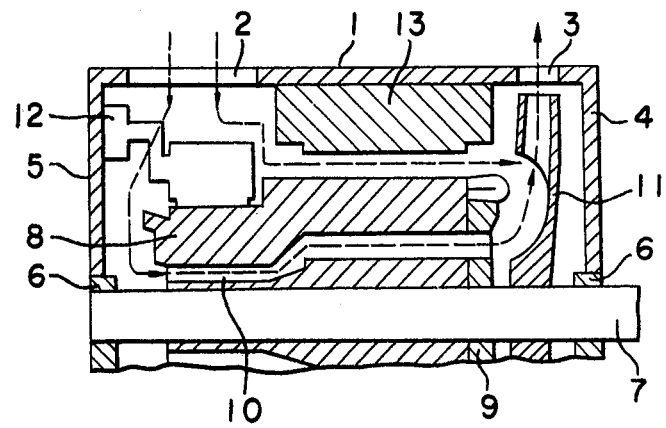
FIG. 1 is a front view of a rotating electric machinery.

Referring to the drawings, the embodiments of the present invention will be illustrated.

Figure 4:
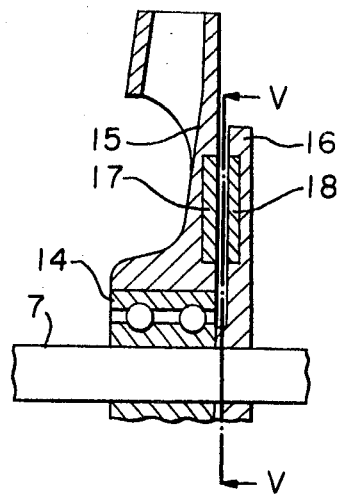
FIG. 4 is a front view of one embodiment of a rotating electric machinery of the present invention.
Figure 5:
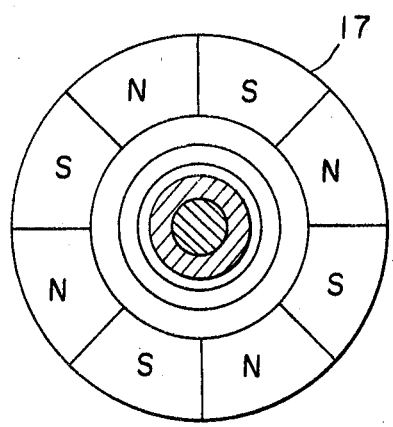
FIG. 5 is a view of a partial arrangement.

In FIG. 4, the reference (7) designates a shaft of the rotor; (14) designate a ball bearing fitted on the shaft (7); (15) designates a fan which is rotatably connected through the ball bearing (14) to the shaft (7); (16) designates a rotating support member fitted to the shaft (7) to face the fan (15) with a desired gap; (17) designates a magnet fitted on a surface which is substantially perpendicular to the shaft (7) of the fan (15); and plural pairs of magnets (17) of N- and S-magnetic poles are provided on the fan 15 as shown in FIG. 5. A magnetic substance (18) is fitted to a rotating support member (16) to face the magnet (17) and is made of a substance having a predetermined coercive force induced by the magnet in the polarity opposite to the polarity of the magnet (17) on the surface in proportional to a corresponding area to the magnet (17) as shown in FIG. 6.

Figure 6:
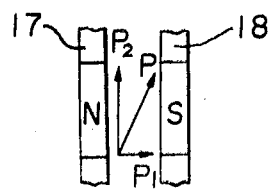
FIG. 6 is a vector of the magnet and the magnetic substance.

In the embodiment having the aforementioned structure, S-pole is induced on the magnetic substance (18) facing to N-pole of the magnet (17) as shown in FIG. 6 under the condition shown in FIG. 4.

When the magnetic substance (18) shifts for Δx to the magnet (17) under the condition in the case of the magnetic substance (18) made of a magnetic material having a predetermined coercive force, the S pole remains at the position to apply the inclined attractive force between the magnet (17) and the magnetic substance shown in FIG. 6. The attractive force applies to the magnet (17) as a tension (P). The component of force ($P_2$) of the tension (P) in the tangential direction is applied as the torque for revolving the magnet (17). The torque ($P_2$) increases depending upon an increase of the coercive force of the magnetic substance.

In FIG. 6, $P=P_1$, and $P_2=0$ when the motor is stopped. The tension (P) is applied between the magnetic substance (18) having a coercive force and the magnet (17) by the rotation of the motor and the fan (15) is rotated by the torque ($P_2$) as the component of force given by the tension (P). When the torque ($P_F$) required for the rotation of the fan (15) is given by increasing the revolving speed of the motor reaches to $P_2<P_F$, the slip of the fan (15) is resulted. Therefore, even though the revolving speed of the motor increases, the revolving speed of the fan (15) is limited to the maximum revolving speed given by the torque ($P_2$).

When the torque $P_F$ 2000 for the revolving speed of the fan (15) at 2000 r.p.m. is set to $P_2=P_F$ 2000, the revolving speed of the fan (15) increases to 2000 r.p.m., the same as that of the motor, however, the fan (15) is driven at the constant revolving speed of 2000 r.p.m. even though the revolving speed of the motor increases over 2000 r.p.m.. The revolving speed of the fan (15) is set by the torque ($P_2$) controlled by the magnetic force of the magnet (17) and the adjustment of the gap between the magnet (17) and the magnetic substance (18). Therefore, the noise (dB) of the motor increases depending upon an increase of the revolving speed of the fan (15) to reach 2000 r.p.m. and the noise level is kept in substantially constant even though the revolving speed of the motor increases over 2000 r.p.m..

Figure 7:
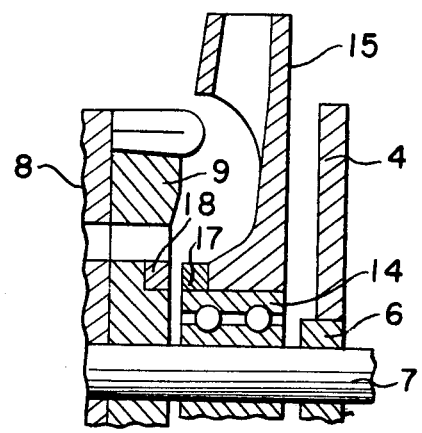
FIGS. 7 and 8 are respectively front view of the other embodiments of the present invention.
Figure 8:
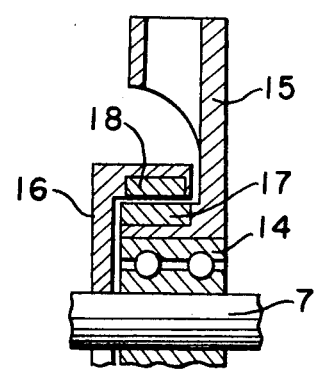

FIGS. 7 and 8 show the other embodiments of the present invention.

In the embodiment shown in FIG. 7, the magnetic substance (18) is fitted to the rotor spider (9) of the rotor (8) to face the magnet (17) fitted to the fan (15) whereby the extension of the motor in the axial direction is prevented together with the same effects of the aforementioned embodiment. As seen in FIG. 7, magnetic substance (18) is mounted on the spider (9) which defines a surface facing a surface defined by magnet (17), the surface are separated by a gap perpendicular to the rotor shaft.

In the embodiment shown in FIG. 8, the magnets (17) and the magnetic substance (18) are arranged to face each other in the circumferencial direction of the rotation of the rotor (8) whereby the same effect of the aforementioned embodiment is attained.

In the embodiments, the magnets are fitted to the fan, and the magnetic substance is fitted to the rotor. However, the same effects of the embodiments are attained by fitting the magnets and the magnetic substance to the other ones of the rotor and the fan.

In accordance with the present invention, the fan is connected through the bearing to the shaft and at least one pair of magnets having a predetermined magnetic force and the magnetic substance having a predetermined coercive factor magnetized by the facing magnet, are respectively fitted to the rotor and the fan to face each other, whereby the fan is driven by the predetermined torque resulting from the rotation of the rotor. The torque of the fan is not increased over a predetermined level. Even though the revolving speed of the motor increases, the noise level is maintained to prevent the noise at high speed range of the revolving speed of the motor which is a traction motor.

What is claimed as new and desired to be secured by Letters Patent of the United States is:

1. A rotating electric machine, comprising:
an armature rotor fixed to a rotatable rotor shaft;
a stationary stator fixed adjacent said rotor;
fan means rotatably mounted via bearing means on said rotor shaft, said fan means including a first surface;
a rotor spider of said rotor spider having a second surface facing said first surface on an axis substantially perpendicular to said rotor shaft and separated therefrom by a predetermined gap;
magnet means having at least two poles and fixed to one of said first and second surfaces; and
a magnetic material fixed to the other of said first and second surfaces, whereby said magnet means and said magnetic material face one another axially and are separated by said predetermined gap.

2. The rotating electric machine according to claim 1 wherein said first and second surfaces comprise circumferential surfaces extending in the radial direction.

3. The rotating electric machine according to claim 1 wherein said machine comprises a traction motor.

* * * * *